Aug. 31, 1926.
G. A. ANDERSON
1,597,948
TRUCK SIDE FRAME
Filed Oct. 17, 1922
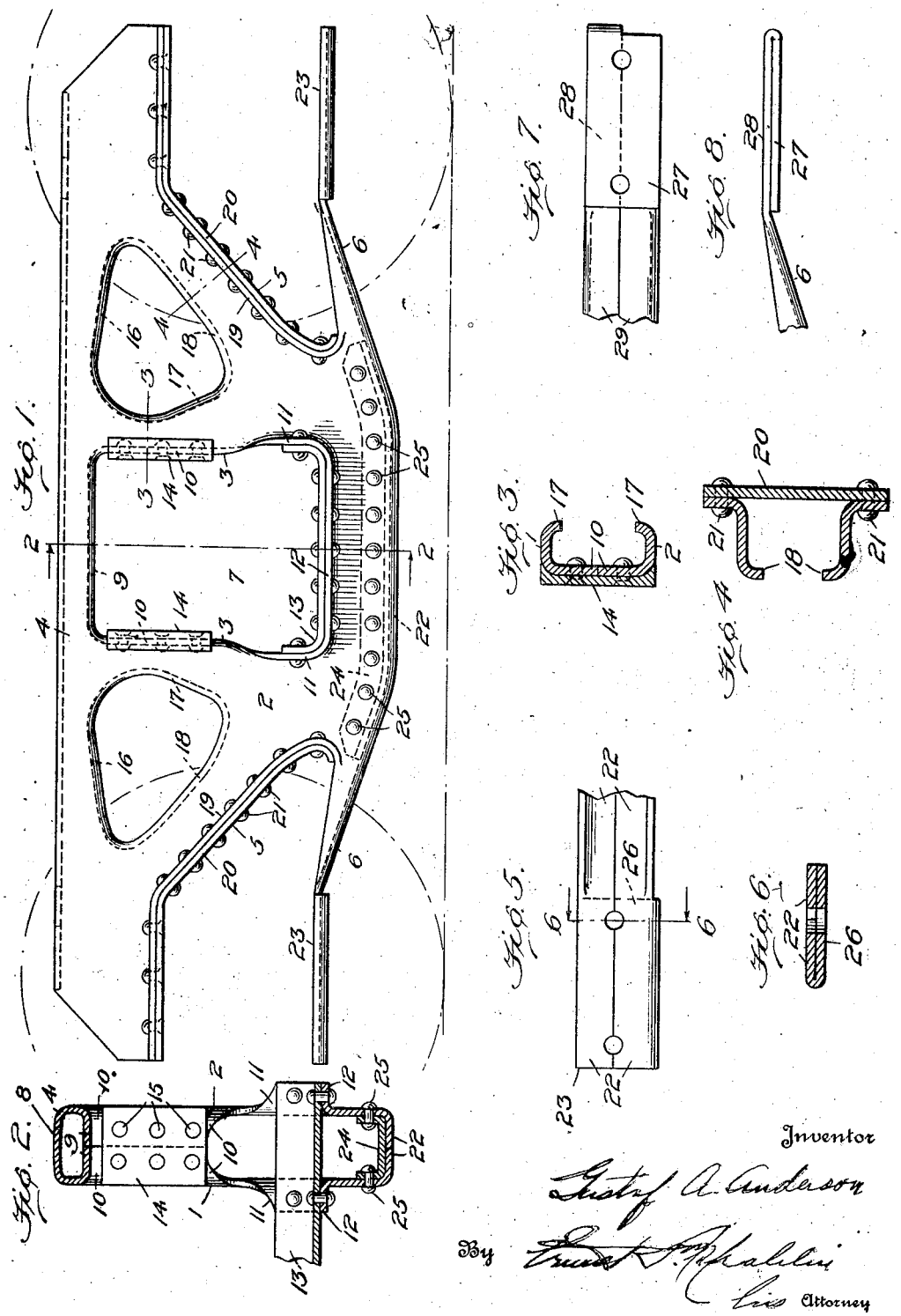

Patented Aug. 31, 1926.

1,597,948

UNITED STATES PATENT OFFICE.

GUSTAF A. ANDERSON, OF BALTIMORE, MARYLAND, ASSIGNOR, BY MESNE ASSIGNMENTS, TO THE SYMINGTON COMPANY, A CORPORATION OF MARYLAND.

TRUCK SIDE FRAME.

Application filed October 17, 1922. Serial No. 595,096.

My invention relates to side frames for car trucks and has been primarily designed to provide a construction which is very strong and stiff but comparatively light in weight, and in which costs incident to maintenance are reduced to a minimum.

The principal feature of the invention, generally stated, resides in forming a car truck side frame with an outer wall of sheet metal and an inner wall of similar material, said walls being formed from a continuous sheet or blank folded at the top and each of said walls being provided with truck column portions, top arch bar portions, bottom arch bar portions and pedestal tie bar portions.

Particularly stated, my invention has for an object the production of a car truck side frame from a continuous blank or sheet of wrought metal shaped to form spaced inner and outer side walls, said side walls being effectively united by tie members which also serve to greatly strengthen the side frame.

Another object of the invention is to provide a pressed metal car truck side frame in which the flanges of the bottom arch bar portions are bent outwardly so as to provide flanges to which the tie members can be easily attached, said flanges and tie members being prolonged at one end to project over the journal boxes and curved at the other end to extend around the corner bend uniting the bottom arch bar portions with the pedestal tie bar portions.

A further feature of the invention resides in the provision of an intermediate strengthening member designed to unite and reinforce the pedestal tie bar portions beneath the bolster opening, said member having end portions adapted to underlie the tie members and flanges extending around the juncture of said pedestal tie bar portions and bottom arch bar portions.

The invention has for a further object the provision of a pressed metal car truck side frame involving truck column portions provided at their upper ends with inwardly extending flanges to which bolster chafing plates may be attached, and at their lower portions with outwardly bent flanges, said last named flanges being preferably continued around the lower corner bends of the bolster opening and across the same to form spring plank seat portions to which the spring plank of the truck is connected.

A still further object of the invention is to provide a car truck side frame from a sheet metal blank and shaping complementary pedestal tie bar portions thereof so that a part of one pedestal tie bar portion overlies an adjacent part of an adjacent pedestal tie bar portion thereby providing a strong and reinforced pedestal tie bar end extending beneath the journal box.

The invention further consists in the method of manufacturing a car truck side frame by forming the same from a continuous sheet metal blank having corresponding side frame portions which are symmetrically disposed with respect to an axis of symmetry passing between them, bending corresponding portions of said blank to form flanges, some of which project from one side of the blank and others of which extend from the other side of said blank, folding the blank along a line at the top of the side frame, which line throughout its length is parallel to said axis of symmetry, bending portions of said blank to overlie an adjacent portion and uniting said flanges.

There are other features of the invention pertaining to particular relation of parts and details of construction all as will hereinafter appear.

In the drawings illustrating the invention, the scope whereof is pointed out in the claims:

Figure 1 is a view in side elevation of a car truck side frame embodying the invention, the wheels of the car truck being shown in dotted lines.

Figure 2 is a transverse sectional view on the line 2—2 of Figure 1.

Figure 3 is a detail horizontal sectional view on the line 3—3 of Figure 1.

Figure 4 is a detail cross sectional view on the line 4—4 of Figure 1.

Figure 5 is a detail plan view of the end of the pedestal tie bar portions of the side frame underlying the journal boxes.

Figure 6 is a detail cross sectional view on the line 6—6 of Figure 5.

Figure 7 is a detail bottom plan view of a modified form of pedestal tie bar portion having overlapped ends.

Figure 8 is a detail view in side elevation of the modified construction shown in Figure 7.

Referring to the drawings in which similar reference characters designate corresponding parts in the several views, my improved side frame includes an inner wall 1 and an outer wall 2 formed from a continuous sheet or blank of metal, said blank being folded at its top along a straight line parallel to the axis of symmetry of said blank. The walls are arranged in spaced relation, and each comprises truck column portions 3, top arch bar portions 4, bottom arch bar portions 5, and pedestal tie bar portions 6. The bolster opening is indicated by the numeral 7.

The metal sheet or blank is folded at the top on a line parallel to its axis of symmetry to form the top arch bar portion, the upper surface of which may be slightly crowned, as indicated by the numeral 8 in Figure 2. The intermediate portions of the top arch bar portions are provided with inwardly extending flanges 9 adapted to merge into the inwardly extending flanges 10 provided at the upper ends of the truck column portions. Other flanges 11 are provided on the truck column portions, said flanges being arranged to project outwardly from the respective inner and outer walls of the side frame and being adapted to extend around the corner bends at the base of the truck column portions and continue across the bolster opening to form the spring plank seat portion 12 adjacent the lower edge of the bolster opening.

A spring plank 13 is shown connected to the flanges projecting from the inner and outer side walls, said spring plank having portions riveted to both vertically arranged flanges 11 and the horizontally disposed flanges forming the spring plank seat portion 12. This construction permits of the spring plank being easily and directly connected to the side frame, although it will be understood that a pad or other interposed member may be used if desired.

The vertically disposed flanges 11 are designed to merge inwardly of the side walls at or above the upper edges of the flanges of the spring plank and form the inwardly extending and abutted flanges 10 hereinbefore referred to. Chafing plates 14 are preferably connected to the flanges 10, rivets 15 being countersunk in the wearing surfaces of said plates and serving to firmly unite the abutted flanges.

Between the truck column portions and the respectively adjacent ends of the side frame, the top arch bar portions of the inner and outer walls are preferably reinforced by oppositely extending flanges 16. The outer edge of each truck column portion is likewise preferably reinforced by an internal flange 17, while the bottom arch bar portions of said walls may advantageously be provided along the upper edges with stiffening flanges 18, said flanges 16, 17 and 18 of each wall being preferably continuous and forming the substantially triangular openings or windows in the side frame, as shown.

The bottom arch bar portions, and more particularly the lower edges thereof, are stiffened by outwardly extending flanges 19, said flanges being preferably prolonged so as to extend over the journal boxes and curved around the corner bends at the junctions of the said bottom arch bar portions with the pedestal tie bar portions for reinforcing said junctions. The bending of the flanges 18 inwardly and the flanges 19 outwardly produces a side wall of Z-bar cross sectional area which permits of the rapid and easy attachment of the tie members 20 designed to unite the spaced inner and outer side frame walls. This Z-bar construction of side wall increases the strength value of the side frame in resisting the various strains to which the side wall sections of the side frame may be subjected under service conditions.

The tie members 20 are shaped to underlie the bottom arch bar portions, each of said tie members comprising a plate bent at its outer end to overlie and contact the journal box and shaped at its inner end to extend around the corner at the juncture of the bottom arch bar portion and adjacent pedestal tie bar portion. Rivets 21 connect the outer edges of the tie plate to the outwardly projecting flanges 19, as best shown in Figure 4. Certain of the rivets 21 uniting the tie plate to the bottom arch bar portions above the journal box are provided with countersunk heads adjacent said journal box. The tie plate serves to greatly reinforce and strengthen the bottom arch bar portions throughout their length and also at the point of juncture between the pedestal tie bar portions and said bottom arch bar portions.

The pedestal tie bar portions 6 of the side frame are provided with inwardly extending stiffening flanges 22 abutted longitudinally and centrally of the side frame, said flanges being preferably continued beneath the bolster opening and terminating at each end of the side frame in relatively flat end portions 23 adapted to extend beneath the journal boxes. Portions of the pedestal tie bar members which are located between the truck columns and the adjacent journal boxes may advantageously be of tapering form, their greatest cross sectional area being at their junctions with the respective truck columns. Interposed between the side walls of the side frame and extending longitudinally thereof beneath the bolster opening is a stiffening member 24 preferably of channel shape and having its flanged portions connected by means of rivets 25 to the respective side walls. The web portion of the channeled reinforcing member 24 is adapted to bridge the joint formed by the abutted inwardly extending stiffening flanges 22. The reinforcing member 24 is preferably designed to snugly fit within the longitudinal groove or channel provided between the spaced side walls, the respective ends of said reinforcing member being slightly inclined to conform to the angular disposition given the pedestal tie bar portions. The respective ends of the reinforcing member 24 are each designed to underlie the outwardly projecting flanges 19 and tie plate 20 bent around the junctions of the lower arch bar portions with said pedestal tie bar portions. Such a construction not only imparts to the side frame increased ability to resist vertical loads but it also reinforces and supports the lower ends of the truck columns so that failure of the truck side frame at these and other associated points cannot well occur.

The end of each pedestal tie bar portion which projects beneath the journal box is preferably reinforced by overlapping a part of an adjacent pedestal tie bar portion, as shown in Figure 6. In this form one of the flat portions 23 at the end of the flange 22 is provided with an extension 26, said extension being bent to underlie the said flat portion and also an adjacent flat portion constituting the extended end of the adjacent flange 22. Journal box bolt openings are provided in the portions of the pedestal tie bar members extending beneath the journal box.

The modified form of reinforced pedestal tie bar end shown in Figures 7 and 8 includes a projecting portion 27 formed at one end of a relatively flat portion 28 provided as a continuation of the inwardly extending stiffening flange 29. The projection 27 is adapted to be bent so as to underlie the flat portion 28 and an adjacent similar portion provided at the end of an adjacent inwardly extending flange carried by the opposite side wall. Journal box bolt openings are provided in the reinforced end portion of the pedestal tie bar member, as shown.

The reinforcing of the pedestal tie bar ends provides a strong and durable construction for effectively tying and supporting the journal boxes.

The method of manufacturing my improved car truck side frame consists in shaping a continuous sheet metal blank having corresponding side frame portions which are symmetrically disposed with respect to an axis of symmetry of the blank passing between them, bending corresponding portions of the blank to form both inwardly and outwardly projecting flanges, then folding the blank along a line or lines at the top of the side frame, which line or lines throughout its or their length is parallel to said axis of symmetry, and finally uniting said flanges by tie means. It will also be perceived that my method of manufacturing car truck side frames involves the overlapping of the ends of the pedestal tie bar portions by folding back a portion of one of the pedestal tie bar sections to underlie its end and also an adjacent part of the adjacent pedestal tie bar portion.

A car truck side frame constructed in accordance with my present invention is light in weight, strong and durable, the joining of the side frame portions by riveting tie members thereto providing a greatly reinforced and reliable structure in which economy of manufacture and rapidity of assembly are achieved.

I claim:

1. A car truck side frame including a continuous metal sheet shaped to form an outer wall and an inner wall arranged in spaced relation, each of said walls having a plurality of truck column portions, a plurality of top arch bar portions, a plurality of bottom arch bar portions, and a plurality of pedestal tie bar portions; and reinforcing tie members connecting said spaced inner and outer walls.

2. A car truck side frame including a continuous metal sheet shaped to form an outer wall and an inner wall arranged in spaced relation, each of said walls having a plurality of truck column portions, a plurality of top arch bar portions, a plurality of bottom arch bar portions, and a plurality of pedestal tie bar portions; and longitudinally arranged reinforcing tie members connecting said spaced inner and outer walls.

3. A pressed metal car truck side frame involving an outer wall and an inner wall arranged in spaced relation, each of said walls having a plurality of truck column portions, a plurality of top arch bar portions, a plurality of bottom arch bar portions, and a plurality of pedestal tie bar portions; and reinforcing tie members connecting the spaced inner and outer walls, said tie members being connected to the lower edges of said bottom arch bar portions.

4. A car truck side frame including a continuous metal sheet shaped to form an outer wall and an inner wall arranged in spaced relation, each of said walls having a plurality of truck column portions, a plurality of top arch bar portions, a plurality of bottom arch bar portions, and a plurality of pedestal tie bar portions; and reinforcing tie plates having their outer edges connected to the lower outer edges of said bottom arch bar portions for uniting said inner and outer walls.

5. A car truck side frame including a continuous metal sheet shaped to form an outer wall and an inner wall arranged in spaced relation, each of said walls having a plurality of truck column portions, a plurality of top arch bar portions, a plurality of bottom arch bar portions, and a plurality of pedestal tie bar portions; outwardly extending flanges provided on said bottom arch bar portions, and tie members having their outer edges connected to said flanges for uniting said inner and outer walls.

6. A pressed metal car truck side frame involving an outer wall and an inner wall arranged in spaced relation, each of said walls having a plurality of truck column portions, a plurality of top arch bar portions, a plurality of bottom arch bar portions, and a plurality of pedestal tie bar portions; outwardly extending portions provided on said walls, and tie members connected to said outwardly extending portions for uniting said walls.

7. A car truck side frame including a continuous metal sheet shaped to form an outer wall and an inner wall arranged in spaced relation, each of said walls having a plurality of truck column portions, a plurality of top arch bar portions, a plurality of bottom arch bar portions, and a plurality of pedestal tie bar portions; extending portions provided on said walls, and tie members riveted to said extending portions for uniting said inner and outer walls.

8. A pressed metal car truck side frame involving an outer wall and an inner wall arranged in spaced relation, each of said walls having a plurality of truck column portions, a plurality of top arch bar portions, a plurality of bottom arch bar portions, and a plurality of pedestal tie bar portions; and tie plates extending beyond the side walls of the side frame and connected to the bottom arch bar portions for uniting said side walls.

9. A pressed metal car truck side frame involving an outer wall and an inner wall arranged in spaced relation, each of said walls having a plurality of truck column portions, a plurality of top arch bar portions, a plurality of bottom arch bar portions, and a plurality of pedestal tie bar portions; and reinforcing tie members connecting the bottom arch bar portions throughout their length, said reinforcing tie members having portions extending above the journal boxes.

10. A pressed metal car truck side frame involving an outer wall and an inner wall arranged in spaced relation, each of said walls having a plurality of truck column portions, a plurality of top arch bar portions, a plurality of bottom arch bar portions, and a plurality of pedestal tie bar portions; and reinforcing tie members connecting the bottom arch bar portions, said tie members having portions projecting above the journal boxes and other portions extending around the corner bends at the junctions of the bottom arch bar portions and pedestal tie bar portions.

11. A pressed metal car truck side frame involving an outer wall and an inner wall arranged in spaced relation, each of said walls having a plurality of truck column portions, a plurality of top arch bar portions, a plurality of bottom arch bar portions, and a plurality of pedestal tie bar portions; flanges projecting outwardly from the bottom arch bar portions, said flanges extending around the corner bends at the junctions of said bottom arch bar portions and pedestal tie bar portions, and tie members extending throughout the length of said flanges for uniting the side walls.

12. A car truck side frame including a continuous metal sheet shaped to form an outer wall and an inner wall arranged in spaced relation, each of said walls having a plurality of truck column portions, a plurality of top arch bar portions, a plurality of bottom arch bar portions, and a plurality of pedestal tie bar portions; and reinforcing tie members having portions extending around the corner bends at the junctions of the bottom arch bar portions and pedestal tie bar portions.

13. A pressed metal car truck side frame involving an outer wall and an inner wall arranged in spaced relation, each of said walls having a plurality of truck column portions, a plurality of top arch bar portions, a plurality of bottom arch bar portions, and a plurality of pedestal tie bar portions, and tie members connecting the bottom arch bar portions, said tie members having their outer ends extending over the journal boxes.

14. A pressed metal car truck side frame including inner and outer side walls arranged in spaced relation, each of said walls having a plurality of truck column portions, a plurality of top arch bar portions, a plurality of bottom arch bar portions, and a plurality of pedestal tie bar portions; each of said bottom arch bar portions being Z-shaped in cross section.

15. A pressed metal car truck side frame including inner and outer side walls arranged in spaced relation, each of said walls having a plurality of truck column portions, a plurality of top arch bar portions, a plurality of bottom arch bar portions, and a plurality of pedestal tie bar portions, each of said bottom arch bar portions being provided with outwardly and inwardly extending stiffening flanges.

16. A pressed metal car truck side frame including inner and outer side walls arranged in spaced relation, each of said walls having a plurality of truck column portions, a plurality of top arch bar portions, a plurality of bottom arch bar portions, and a plurality of pedestal tie bar portions; each of said bottom arch bar portions being Z-shaped in cross section, and means including a tie member connecting the lowermost flanges of said Z-shaped bottom arch bar portions for uniting the side walls.

17. A car truck side frame involving a metal blank shaped to form inner and outer side walls arranged in spaced relation, each of said walls having a plurality of truck column portions, a plurality of top arch bar portions, a plurality of bottom arch bar portions, and a plurality of pedestal tie bar portions; and longitudinally disposed reinforcing means uniting said pedestal tie bar portions beneath the bolster opening.

18. A car truck side frame involving a metal blank shaped to form inner and outer side walls arranged in spaced relation, each of said walls having a plurality of truck column portions, a plurality of top arch bar portions, a plurality of bottom arch bar portions, and a plurality of pedestal tie bar portions; and means including a reinforcing channel member adapted to bridge and unite the inner and outer side walls.

19. A car truck side frame involving a metal blank shaped to form inner and outer side walls arranged in spaced relation, each of said walls having a plurality of truck column portions, a plurality of top arch bar portions, a plurality of bottom arch bar portions, and a plurality of pedestal tie bar portions; and means including a reinforcing member adapted to connect the inner and outer side walls beneath the bolster opening.

20. A car truck side frame involving a metal blank shaped to form inner and outer side walls arranged in spaced relation, each of said walls having a plurality of truck column portions, a plurality of top arch bar portions, a plurality of bottom arch bar portions, and a plurality of pedestal tie bar portions; and reinforcing means connected to the inner opposed faces of said side walls for uniting the same, said reinforcing means being arranged longitudinally of the truck.

21. A car truck side frame involving a metal blank shaped to form inner and outer side walls arranged in spaced relation, each of said walls having a plurality of truck column portions, a plurality of top arch bar portions, a plurality of bottom arch bar portions, and a plurality of pedestal tie bar portions; means reinforcing said bottom arch portions, and means reinforcing said pedestal tie bar portions, said last named means having portions underlying said first named reinforcing means at the junctions of the bottom arch bar portions with the pedestal tie bar portions.

22. A car truck side frame involving a metal blank shaped to form inner and outer side walls arranged in spaced relation, each of said walls having a plurality of truck column portions, a plurality of top arch bar portions, a plurality of bottom arch bar portions, and a plurality of pedestal tie bar portions, means reinforcing said bottom arch bar portions, and longitudinally disposed means for reinforcing the pedestal tie bar portions, said last named means having its end portions underlying end portions of said first named reinforcing means.

23. A car truck side frame involving a continuous sheet of metal folded at the top and shaped to form inner and outer side walls arranged in spaced relation, each of said side walls having a plurality of truck column portions, a plurality of top arch bar portions, a plurality of bottom arch bar portions, and a plurality of pedestal tie bar portions, said pedestal tie bar portions being provided with inwardly extending flanges, and means connecting said side walls, said means including a reinforcing member adapted to bridge the joint between said inwardly extending flanges.

24. A car truck side frame involving a continuous sheet of metal folded at the top and shaped to form inner and outer side walls arranged in spaced relation, each of said side walls having a plurality of truck column portions, a plurality of top arch bar portions, a plurality of bottom arch bar portions, and a plurality of pedestal tie bar portions; and a reinforcing member uniting the opposite edges of said continuous folded metal sheet, said member being disposed longitudinally of the truck.

25. A car truck side frame involving a continuous sheet of metal folded at the top and shaped to form inner and outer side walls arranged in spaced relation, each of said side walls having a plurality of truck column portions, a plurality of top arch bar portions, a plurality of bottom arch bar portions, and a plurality of pedestal tie bar portions; and a reinforcing member uniting opposite edges of said continuous folded sheet at the bottom of the side frame.

26. A car truck side frame involving a continuous sheet of metal folded at the top and shaped to form inner and outer side walls arranged in spaced relation, each of said side walls having a plurality of truck column portions, a plurality of top arch bar portions, a plurality of bottom arch bar portions, and a plurality of pedestal tie bar portions; and means including a channel member connecting the edges of the folded sheet, said means extending beneath the bolster opening and underlying the junctions of the bottom arch bar portions with the pedestal tie bar portions.

27. A pressed metal car truck side frame involving a metal sheet shaped to form spaced inner and outer side walls, each of said side walls having a plurality of truck column portions, a plurality of top arch bar portions, a plurality of bottom arch bar portions, and a plurality of pedestal tie bar portions, said truck column portions being provided with inwardly extending flanges at their upper ends and outwardly extending flanges at their lower ends, said outwardly extending flanges forming a spring plank seat portion.

28. A pressed metal car truck side frame involving a metal sheet shaped to form spaced inner and outer side walls, each of said side walls having a plurality of truck column portions, a plurality of top arch bar portions, a plurality of bottom arch bar portions, and a plurality of pedestal tie bar portions, said truck column portions being formed with inwardly and outwardly projecting flanges, said inwardly projecting flanges bordering the upper edge of the bolster opening, and said outwardly projecting flanges bordering the lower edge of the bolster opening.

29. A pressed metal car truck side frame involving a metal sheet shaped to form spaced inner and outer side walls, each of said side walls having a plurality of truck column portions, a plurality of top arch bar portions, a plurality of bottom arch bar portions, and a plurality of pedestal tie bar portions, said truck column portions being formed with inwardly abutted flanges, chafing plates uniting said flanges, and outwardly extending flanges adjacent said truck column portions adapted to form a seat portion for the spring plank of the truck.

30. In a car truck, the combination with a car truck side frame formed of sheet metal shaped to provide inner and outer spaced side walls having bolster openings, each of said side walls having a plurality of truck column portions, a plurality of top arch bar portions, a plurality of bottom arch bar portions, and a plurality of pedestal tie bar portions; flanges provided adjacent said truck column portions, and a spring plank connected to said flanges.

31. In a car truck, the combination with a car truck side frame formed of sheet metal shaped to provide inner and outer spaced side walls having bolster openings, each of said side walls having a plurality of truck column portions, a plurality of top arch bar portions, a plurality of bottom arch bar portions, and a plurality of pedestal tie bar portions; outwardly extending flanges formed adjacent said truck column portions, and a spring plank having portions thereof riveted to said outwardly extending flanges on each side of the side frame.

32. In a car truck, the combination with a car truck side frame formed of sheet metal shaped to provide inner and outer spaced side walls having bolster openings, each of said side walls having a plurality of truck column portions, a plurality of top arch bar portions, a plurality of bottom arch bar portions, and a plurality of pedestal tie bar portions; flanges provided on said truck column portions and continuing across the lower edges of the bolster openings in the side walls, and a spring plank connected to said flanges.

33. In a car truck, the combination with a car truck side frame formed of sheet metal shaped to provide inner and outer spaced side walls having bolster openings, each of said side walls having a plurality of truck column portions, a plurality of top arch bar portions, a plurality of bottom arch bar portions, and a plurality of pedestal tie bar portions; outwardly extending flanges provided on said truck column portions, said flanges continuing across the lower edges of the bolster openings in the side walls, a spring plank, and rivet means connecting said spring plank to said flanges.

34. A car truck side frame involving a sheet metal blank shaped to form inner and outer spaced side walls, each of said walls having a plurality of truck column portions, a plurality of top arch bar portions, a plurality of bottom arch bar portions, a plurality of pedestal tie bar portions; said pedestal tie bar portions having inwardly extending stiffening flanges terminating in relatively flat end portions beneath the journal box, and means integral therewith for reinforcing the same.

35. A car truck side frame involving a sheet metal blank shaped to form inner and outer spaced side walls, each of said walls having a plurality of truck column portions, a plurality of top arch bar portions, a plurality of bottom arch bar portions, and a plurality of pedestal tie bar portions, said pedestal tie bar portions having inwardly extending stiffening flanges terminating in relatively flat end portions beneath the journal box, said flat end portions being reinforced by bending a portion thereof to underlie itself and the adjacent flat end portion.

36. A car truck side frame involving a sheet metal blank shaped to form inner and outer spaced side walls, each of said walls having a plurality of truck column portions, a plurality of top arch bar portions, a plurality of bottom arch bar portions, and a plurality of pedestal tie bar portions; said pedestal tie bar portions being provided with relatively flat outer ends underlying the journal boxes, said flat outer ends being reinforced by doubling the material thereacross.

37. A car truck side frame involving a sheet metal blank shaped to form inner and outer spaced side walls, each of said walls having a plurality of truck column portions, a plurality of top arch bar portions, a plurality of bottom arch bar portions, and a plurality of pedestal tie bar portions, said pedestal tie bar portions being provided with relatively flat end portions, said flat end portions being reinforced by bending a projection of an adjacent pedestal tie bar end portion to form a double thickness of metal beneath the journal box.

38. A car truck side frame involving a sheet metal blank shaped to form inner and outer spaced side walls, each of said walls having a plurality of truck column portions, a plurality of top arch bar portions, a plurality of bottom arch bar portions, and a plurality of pedestal tie bar portions, said pedestal tie bar portions being provided with end portions formed by bending a projection of an adjacent tie bar end portion to increase the thickness of said end portion beneath the journal box.

39. A car truck side frame involving a sheet metal blank shaped to form inner and outer spaced side walls, each of said walls having a plurality of truck column portions, a plurality of top arch bar portions, a plurality of bottom arch bar portions, and a plurality of pedestal tie bar portions, said pedestal tie bar portions being provided with end portions formed by bending a projection of an adjacent pedestal tie bar end portion to increase the thickness of material beneath the journal box, said projection serving to unite the adjacent end portions of said respective tie bar portions.

40. The method of manufacturing car truck side frames which consists in forming the same from a continuous sheet metal blank having corresponding side frame portions which are symmetrically disposed with relation to an axis of symmetry passing between them, bending corresponding portions of said blank to form outwardly and inwardly extending flanges, folding the blank along a line at the top of the side frame, which line throughout its length is parallel to said axis of symmetry, bending portions of said blank back upon themselves, and finally uniting said flanges.

41. The method of manufacturing car truck side frames which consists in forming the same from a continuous sheet metal blank having corresponding side frame portions which are symmetrically disposed with respect to an axis of symmetry passing between them, bending corresponding portions of said blank to form outwardly and inwardly projecting flanges, folding the blank along a line parallel to the said axis of symmetry, and finally connecting said inwardly and outwardly extending flanges.

42. The method of manufacturing car truck side frames which consists in forming the same from a continuous sheet metal blank having corresponding side frame portions which are symmetrically disposed with respect to a straight line positioned as an axis of symmetry passing between them, bending portions of said blank to form outwardly projecting flanges, folding the blank along lines parallel to each other and parallel to said axis of symmetry, and finally connecting said flanges.

In testimony whereof I affix my signature.

GUSTAF A. ANDERSON.